Jan. 31, 1939.   W. J. PETER   2,145,572
LIQUID DISPENSER
Filed July 7, 1930   7 Sheets-Sheet 5

Inventor
WILLIAM J. PETER
By Dohleber + Ledbetter
Attorneys

Jan. 31, 1939.   W. J. PETER   2,145,572
LIQUID DISPENSER
Filed July 7, 1930   7 Sheets-Sheet 6

Inventor
WILLIAM J. PETER
Attorneys
Bohleber + Ledbetter

Jan. 31, 1939. W. J. PETER 2,145,572
LIQUID DISPENSER
Filed July 7, 1930 7 Sheets-Sheet 7

FIG. II

INVENTOR
WILLIAM J. PETER
BY
Bohleber & Ledbetter
ATTORNEYS

Patented Jan. 31, 1939

2,145,572

UNITED STATES PATENT OFFICE 2,145,572

LIQUID DISPENSER

William J. Peter, Bronx, N. Y., assignor, by mesne assignments, to Aqua Systems Incorporated, New York, N. Y., a corporation of New York Application July 7, 1930, Serial No. 466,060

61 Claims. (Cl. 221—95)

This invention relates to liquid dispensing or delivery systems and apparatus suitable for handling oil, gasoline and the like. More particularly, the invention relates to hose and nozzle control means employed to fill fuel tanks of automotive vehicles and for other purposes. While the invention contemplates dispensing apparatus for handling all liquids or fluids, the term "oil" may be used generally in the interest of brevity.

In many forms of liquid or oil dispensing apparatus for gasoline stations, a flexible hose is used for servicing or filling tanks of automobiles or other automotive vehicles. An object, among others, of the present invention is to produce novel control means to stop and start the flow of oil through the hose, a significant feature residing in control means which is actuated by tensioning or pulling on the hose by the attendant to start the flow of oil through the discharge hose, to fill the tank, and the release of the tension to stop the flow when the desired amount of oil is drawn. This mode of operation positively disconnects or stops the pumping or flow producing means and hence removes all force or pressure from the oil so that in event of a break in the pipe line, a leak or other troubles, no oil will flow or waste. Fire, waste and other hazards are reduced to a minimum.

Certain types of gasoline or oil dispensing apparatus include an electric circuit control means having a power circuit to energize or operate hydraulic or other pumping or delivery means to force the gasoline from a storage tank outwardly through a discharge pipe and flexible dispensing hose. A valve may be included in the pipe and a switch in the circuit, and one or the other, or both in combination, are coordinated with the service hose or movable conduit so that when one is open the other is closed; and this invention provides a safe positive flow and control means for use with this type of apparatus.

An important object of the invention is to produce oil dispensing apparatus having a novel discharge hose or movable conduit control means which is specially designed for use in connection with curb pumps used at filling stations, garages and the like, and wherein a valve and/or an electric switch are coordinated with the hose to positively stop and start the flow of gasoline when the hose line nozzle is removed from a curb pump or wall panel and introduced into the fuel tank for filling it.

It is an object, among others, to produce a dispensing hose which automatically actuates a control means, which may be electrical, mechanical or both, to remove or disconnect the fluid pressure when the apparatus is not delivering oil; and conversely this hose control applies the hydraulic or pumping pressure to the oil when the hose is removed from its accustomed support hook and carried to filling position. An important feature and object resides in this means, electrical, mechanical, or both in combination, as actuated by manually pulling on or tensioning the discharge hose to start and stop the flow of liquid.

A further object is to produce saft dispensing apparatus having a combined or independent switch and valve means, either or both of which are provided with interlocking means which may be automatically or manually unlocked by or when removing the hose nozzle from inoperative or non-use position off of its support hook; and the normally open switch is locked against closing movement or misoperation unless the normally closed valve is first opened, and the valve is locked against opening movement should the switch control means be inadvertently under tension. In this way, a station attendant or operator is compelled to open the valve before closing the circuit and hence when the pumping starts there is an open unobstructed flow of oil.

It is also an object to produce apparatus of the kind in question wherein both ends of the dispensing hose, the free or nozzle end thereof and the attached or stationary end thereof, are employed to control the action of either the valve or switch means or the combination thereof and to control the locking means.

Having the foregoing and other objects in view, the accompanying drawings show several examples of the invention by presenting different species of construction to bring out the breadth and principles involved, and it is to be understood that changes in structure and mode of operation may be resorted to without departing from the spirit of the invention. Figures 1 and 2 illustrate two forms of construction in its elementary and diagrammatic form, and Figures 3 through 10 disclose a third or substantially a preferred type of construction.

Throughout the drawings and the several alternate forms of construction, there appears the significant feature of a flexible hose, but other forms of movable conduit means may be used. The movement or the tension applied to the hose is utilized to effect the desired automatic control by which the flow of oil is started by pulling the hose to a tank to be filled and stopped by returning the hose to its hook and non-use position.

Figures 3 through 10 show a preferred form of construction wherein the hose is coordinated with a combination electric switch and valve control means. For simplicity in illustration there are shown simple forms of valves and switches but in the commercial or preferred form of construction, the manufacturer uses standard parts. The pump control power circuit is broken away and it is only necessary to explain the making and breaking of this circuit since in Figure 1 there is shown a pumping or delivery means and an outline of its circuit.

The foregoing views of the third form of the invention show the parts in their several positions to make clear the novelty in the mode of operation as well as in the new construction. The diagrammatic storage tank and pumping means outlined in the Figures 1 and 2 forms of the invention are merely standard practice and it, or any other suitable pumping means for applying pressure to the liquid whereby it is forced upwardly out of the storage tank, may as well be used and this explanation applies to the third form of the invention shown in Figures 3 through 11.

A description of the first form of the invention will now be given and reference is had to Figure 1. The hose and related control parts are assembled in a pump stand housing or on a panel 11 and a liquid, gasoline, or oil feed pipe 12 leads upwardly from the upper wall of a storage tank 13 located underground or at any suitable place. Gasoline is indicated as stored in the tank and floating on top of a displacement liquid, water, and by which the gasoline or oil is hydraulically pumped out of the tank 13 by admitting water to the bottom of the tank.

Oil to be dispensed is forced upwardly through the oil feed or discharge pipe 12 by any suitable delivery or pumping means and outwardly through a discharge hose 14, attached at 18 to the pipe 12 and the other end of the hose carries a discharge nozzle 15. The general assembly shown in Figure 1 is illustrated in connection with the underground tank 13 to fully disclose the entire system, but it is to be appreciated that this invention relates, among other things, to a new hose means and its correlated parts, whereby motion of the hose 14, tensioning or pulling thereon by the attendant, starts the pumping means and hence the flow of gasoline through the feed pipe 12 and out through the nozzle 15.

Figure 1:
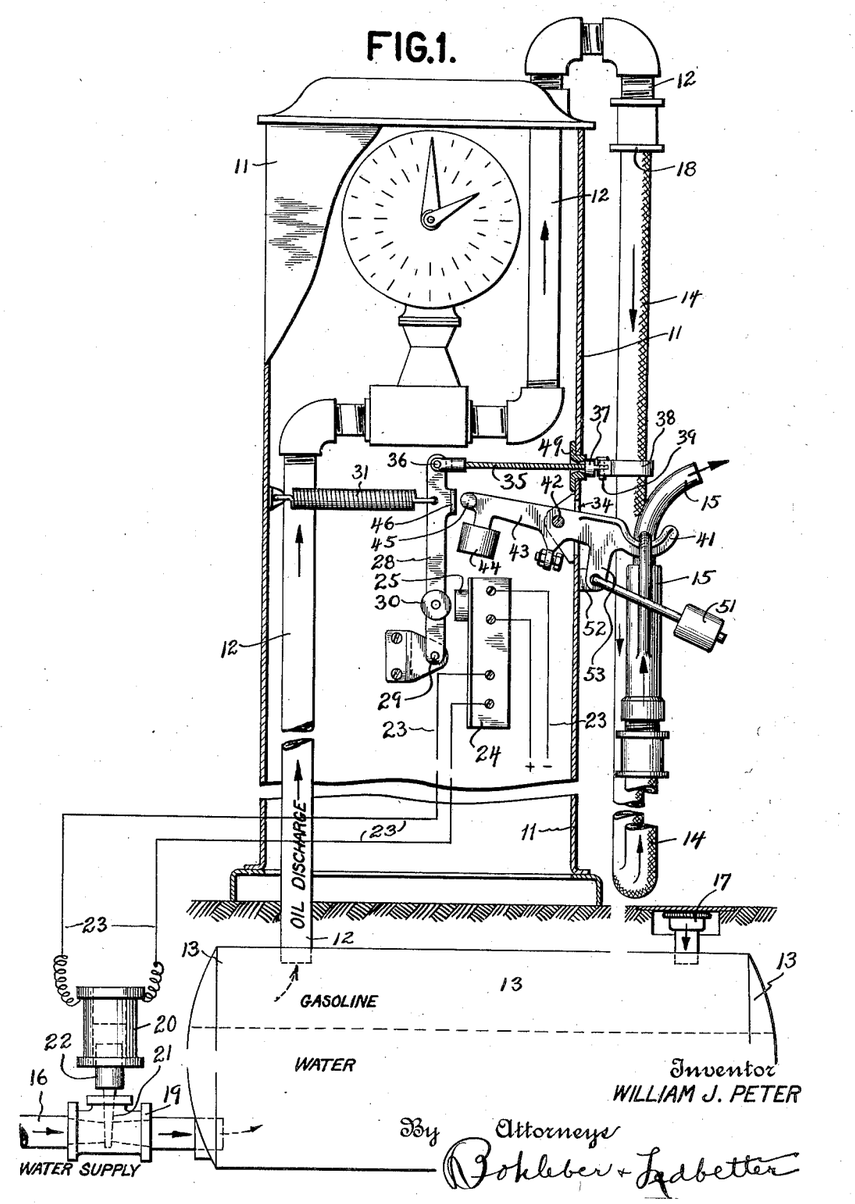
Figure 1 is a diagrammatic view of the invention shown in connection with an underground oil storage tank and hydraulic pressure line to force the oil from the tank upwardly through the system and out through the novel hose means. A noteworthy feature of this form is that the control is electrical and entirely related to circuit and switch means and without recourse to valve control means. The parts in this view are shown in non-use or normal position.

The pumping or delivery means chosen for illustrating the invention in Figure 1, or other views, consists of the underground tank 13 together with hydraulic means for elevating the oil from the tank upwardly through the dispensing apparatus. In this connection, a water feed pipe 16 has one end, not shown, connected with a constant source of water supply under any suitable pressure, such as that in a city water supply main, and has its illustrated end connected to the bottom of the tank 13 to feed water, as indicated on the drawings, to displace or float gasoline, likewise indicated on the drawing, thereabove, and thus lift the gasoline or oil upwardly through the oil discharge pipe 12, which is connected to the upper wall of the tank 13. A fill pipe and cap 17 connects with the tank 13 and is ordinarily flush with the ground surface and through it the tank is refilled with gasoline. Conventional or standard parts, including a waste pipe and control valve, not shown, may be connected to tank 13 in the usual way to discharge or carry off the displacement water to the sewer when the tank is being refilled with gasoline.

In a hydraulic pumping means, it is the usual practice to provide a normally-closed water control valve 19 in the pipe 16. This valve 19 is opened to admit water to the lower portion of storage tank 13 to force gasoline upwardly through the apparatus and discharge it from the hose 14; and the valve 19 is automatically closed to stop the flow of oil. Motor means is necessarily required to operate the valve 19, and to this end the electrically actuated valve 19 is opened and closed by a solenoid or magnet means 20. A valve gate or head 21 is adapted to be reciprocated in the valve housing 19 to open and close the port therein through which the oil displacement water flows to the tank 13. The valve gate 21 is carried on a solenoid core 22, which reciprocates in the solenoid winding 20. When the coil 20 is energized, the core or plunger 22 draws the gate 21 out of the valve 19, whereupon water flows to the tank 13 from a city water main or other source.

Current is transmitted to the magnet means 20 through a circuit 23, which includes a normally-open switch shown diagrammatically at 24. By closing the switch 24, the solenoid 20 is energized and the valve 19 opened with the result that water flows into the tank 13 and a corresponding amount of oil is discharged upwardly through the oil discharge pipe 12. Any suitable form of switch mechanism 24 may be employed and the one shown includes, among other things, a standard form of spring loaded plunger or button 25 which is mounted in the switch housing 24. The circuit wires 23 are connected with the switch 24 and when the plunger 25 is normally out as shown in Figure 1, the circuit 23 is broken with the result that the weighted or spring loaded solenoid core 22 closes off the water supply which was previously flowing into the tank 13. When the standard form of switch plunger 25 is pressed inwardly, the circuit 23 is closed with the result that the solenoid means 20—22 is actuated and the normally-closed valve means 19—21 is opened to dispense oil through hose 14.

This Figure 1 form of the invention has to do with the control of the switch and circuit means 23—24 from the flexible hose 14 in a new and simple way. To this end, a switch control lever or arm 28 is pivoted at 29 in the housing or panel 11 and carries a roller 30 in alignment with the axis of the switch button 25. By swinging the lever 28 clockwise as viewed in Figure 1, it follows that the roller 30 depresses the switch plunger 25 to close the switch 24 and circuit 23 to energize the magnet means 20—22 and start the flow of oil outwardly through the hose nozzle 15.

A spring or other retractile means 31 normally holds the switch lever 28 and its roller away from the switch plunger 25 and hence the plunger is normally out with the switch 24 open to keep idle the electric power means 20, which allows the weighted or spring actuated gate valve 21 to remain normally closed when oil is not being withdrawn from nozzle 15.

An operating means is provided between the hose 14 and the flow control means 25—28 by which the attendant starts and stops the oil flow by pulling on or releasing the hose, and this is a significant feature of the invention. To this end, a flexible or operating connection of any suitable form, shown here as a cable or cord 35, has its inner end attached at 36 to the pumping control means represented by the switch lever 28 and its outer end is attached at 37—39 to the hose. A cuff or loop 38 embraces the hose 14 and a pin 39 serves to attach the cuff 38 to the cable or cord head 37. The pin 39 is shown disposed vertically to place it parallel to the axis of the hose 14 so that lateral motion of the hose 14 takes place freely about the pin axis 39 so that the hose 14 can be pulled in any direction about and in relation to the housing 11. The cord or cable 35 slides through a bushing guide 49 fixed in the housing 11. The cable 35 flexes and bends laterally to either side of the guide 49 and in fact has a universal movement. The inherent flexibility of the cable 35 and the pivot 39 together afford freedom of hose movement in all directions. The anchorage head 37 stops against the bushing 49 and takes the pull exerted by the spring 31 to hold the roller 30 and other parts in proper relation to the switch 24.

The nozzle 15 is designed to normally hang on a hook 41 pivoted at 42 to lock the apparatus against misoperation. This hook lever 41—43 is pivotally mounted through a slot 34 in the housing or panel 11 and the hook end 41 is exposed outside of the housing. The inner end 43 of this hook lever swings up and down within the housing and may to advantage carry a weight 44 on the inner end thereof to throw the hook 41 upwardly when the weight of the hose and nozzle 15 is removed therefrom. The inner end 43 of this hook lever is designed to lock against the control lever 28 so as to prevent operation of the latter unless the nozzle 15 has been removed from the hook 41 and hence the nozzle is in the attendant's hands and under his control for filling a fuel tank. To this end, a locking head or pin end 45 is made on the inner end of the hook lever 41—43 and impinges or coacts with an abutment shoulder 46 formed on the switch lever 28. It is apparent that tension on the cable 35 will not close the switch 24 unless the station attendant removes the hose nozzle.

The foregoing arrangement makes for safety and provides against misoperation of the system in that the manipulation of the hose 14, as by carelessly pulling on it near the loop 38, cannot effect the closing of the switch 24 and hence cannot start the flow of gasoline upwardly through pipe 12 so long as the nozzle 15 is hanging on the hook 41 because the weight of the nozzle tilts the lock head 45 into locking position in front of the shoulder 46. On the other hand, the removal of the nozzle 15 permits the weight 44 to quickly pull the locking head 45 down away from the path of movement of the lever shoulder 46, whereupon the switch arm or lever 28 may be pulled by the operator who places a slight tension on the cable 35 by carrying the nozzle 15 to the fuel tank. The operating connection 35 consists of a strand, spiral steel cord, or cable means. However, any suitable form of link connection may be employed as will be appreciated.

The hose support hook 41 is ordinarily equipped with a lock 51 engaging an ear 52 and shank 53 formed integrally with the hook 41. This is standard practice and the padlock 51 is removed to free the hook 41 so an attendant may set the apparatus in operation. In the use of the apparatus, the operator simply removes the nozzle 15 from the hook 41 and carries the nozzle to a tank or any vessel to be filled with oil and in doing so he inserts the nozzle 15 into the tank orifice by one hand and pulls on the hose 14 with the other hand. This results in pulling the cable connection 35 through the bushing 49, stretching the spring 31, whereupon the roller 30 or other means, depresses the switch plunger 25 and holds it in to close the circuit 23 and open the water feed valve 19—21. So long as the roller 30 holds in the switch button 25, the oil flows through the hose, and the operator holds the roller 30 to operative position by tension on the hose. Generally speaking, the delivery hose may be pulled in any direction, or more particularly in any direction within an arc of one-hundred and eighty degrees, to actuate the flow control device 28 or switch 25.

Figure 2:
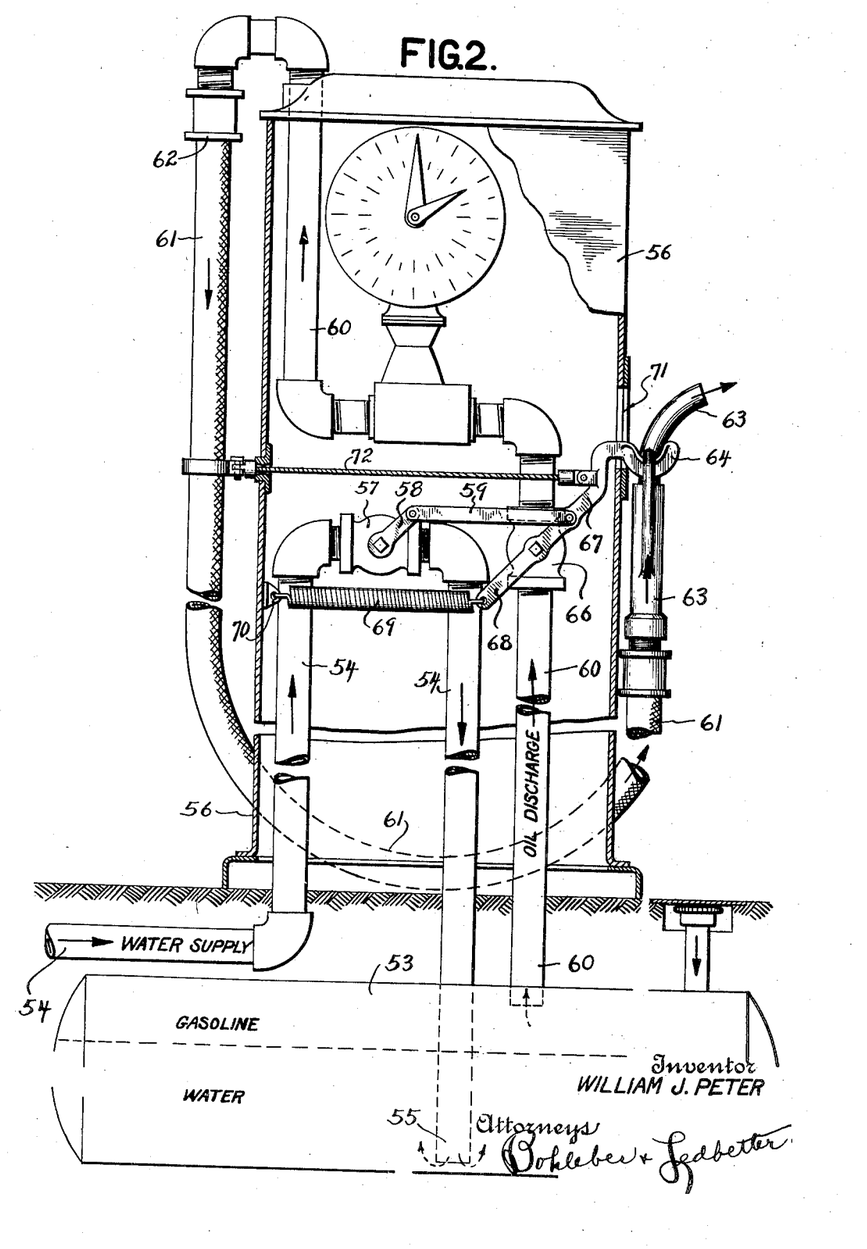
Figure 2, on the other hand, shows a form of hose control means which is entirely mechanical in that movement of the hose is designed to operate valve means only, say one or more valves to govern the oil flow.

A description will now be given of the second form of construction as shown in Figure 2, wherein a valve control system is disclosed and the electrical control is entirely eliminated. An underground storage tank 53 is provided and it is ordinarily filled with gasoline as indicated and a water supply pipe 54 empties at 55 at the bottom of the tank. The water feed pipe 54 extends upwardly into a pump stand housing or panel 56. In other words, the water pipe 54 is carried up into housing 56 to a point where it is convenient to install valve means to open and close this pipe. A water cutoff valve 57 is provided with an arm 58 to hold the valve 57 normally closed by spring means 69, weight means as an equivalent thereof, or other suitable yielding or force-applying means, when water is not desired to flow through the pipe 54.

An oil discharge pipe 60 connects with the upper wall of the tank 53 and extends outwardly through the housing 56. A flexible discharge hose 61 is connected at 62 with the upper end of the gasoline feed pipe 60, and hence near the end or at the coupling 62 the flexible hose is relatively stationary. The other and free end of the hose carries a discharge nozzle 63 which ordinarily rests on a nozzle support hook 64 when not in use to lock the apparatus against operation. An important feature resides in means to utilize both ends of the hose to control the flow of oil through the pipe 60 and discharge hose 61, as will be explained.

An oil control valve 66 is included in the oil discharge pipe 60 and is controlled by an arm 67 which is a continuation of the hook 64. The hook arm 64—67 is fixed on the core of the oil valve 66 and hence pivots on that valve to open and close it. A link 59 operatively connects the water valve arm 58 with the oil valve arm 67 so that the valves 57 and 66 operate in unison because they are interconnected by the elements 58, 59 and 67. In fact, the arm 67 is extended to provide a spring arm 68. A spring 69 has one end connected to a stationary anchorage 70 and its free end to arm 68. The spring 69, therefore, normally urges the hook lever 67 outwardly through a slot 71 to a normally limited outward position, as shown in Figure 2, which closes the water valve 57 and oil valve 66, holding the hook 64 in exposed position outside of the housing 56. The apparatus is now set against operation in that the water valve 57 is closed and displacement liquid cannot flow to tank 53 to pump water therefrom.

In this form of construction shown in Figure 2, the relatively stationary end of the hose 61, near the coupling 62, is mounted to one side of the housing 56, while the hook 64 is on the other side thereof. In this way, the filling or discharge hose 61 is carried around the housing 56 and placed on hook 64 and the operator simply removes the nozzle 63 from its hook 64 and carries it to the automobile fuel tank or other vehicle to be supplied with gasoline. As in the first form of the invention, a flexible cable 72 connects the flow-control means 67 with the flexible hose line 61.

In operating the apparatus, the station attendant introduces the nozzle 63 with one hand into the fuel tank and pulls on the hose 61 with his other hand, whereupon the flexible connection 72 swings the valve control lever 67 in a counterclockwise direction to open both valves 57 and 66 against the spring 69, which holds this valve means normally closed. The two valves 57 and 66 are now open and water flows through pipe 54 to the bottom of tank 53, thereby displacing an equivalent volume of oil and thus lifting or pumping the oil on top of the water upwardly through the oil discharge pipe 60, passing the open valve 66 and flowing outwardly through the flexible hose 61 as long as the attendant maintains tension or a pull on the cable connection 72.

It is observed that the cable connection 72 between the hose 61 and valve control lever 67 withdraws the hook 64 through the housing slot 71 and hence the hook 64 disappears into the housing 56 so that the operator actually cannot hang the nozzle 63 up until he has released the hose 61 and the spring 69 has drawn the cable 72 into the housing and closed both control valves 57 and 66. In other words, the movable nozzle support or hook 64 with the housing slot 71 provide a means compelling the movement of one or both of the flow control elements or valves 57 and 66 into a position to stop the hydraulic or pumping flow of the water as a prerequisite to the placing of the nozzle upon the support. That action having taken place, the oil flow stops, and it is now possible for the attendant to restore the nozzle 63 to its hook 64 until the next operation.

The presence of the nozzle 63 on the hook 64 locks the valve means 57—66 against opening action because the slot 71 will not, of course, admit the nozzle 63 and hence nothing happens should one inadvertently pull on the hose where it is connected to the cable 72. It will now be appreciated that the motion of both ends of the hose is employed to operate the apparatus in that the flexible hose portion 61, adjacent the coupling 62, is moved to pull on the cable 72 and the free nozzle end of the hose must be removed from its hook to permit the flexible cable to be pulled. This feature makes for safety in handling gasoline.

It is noted in Figure 2 that the oil control valve 66 is operatively connected with the hydraulic control valve 57, but, as a matter of fact, the apparatus functions in a satisfactory way without employing the valve 66 and it may be omitted if desired. In other words, it is the hydraulic pumping control valve 57 which actually stops and starts the flow of oil upwardly through pipe 60. Should the valve 66 be omitted, the flexible cable 72, or any equivalent means therefor, is relied on to actuate the pumping control means 59. Similarly, it is observed that the hook 64 may be altered in form and relation with the other parts to meet the requirements of the manufacturer. In other words, my invention contemplates a simple, direct connection, if desired, between the hose-operated cable 72 and the pump-control means 59. For example, the hose-operated cable 72 may be directly connected with the valve arm 58. This explanation is given to show the scope and principle of the invention inasmuch as all obvious modifications cannot be illustrated.

Coming now to a description of the third form of the invention, reference is made to Figures 3 through 10 showing a preferred or commercial form of construction. It is to be understood, however, that standard parts such as valves, switches and the like are used in the manufacture of this apparatus whereas they are diagrammatically shown for simplicity in the accompanying drawings. Furthermore, the storage tank equipment, including the hydraulic pumping or flow-control means, is omitted in view of the fact that the same was shown in the form of construction already explained. In other words, only the salient features are shown in this third form including the separate and/or combination valve or switch means coordinated with the flexible hose.

It will also be clear that this third, as well as other forms of construction, may be used with electric motor driven pumps and such is the case for gasoline stations in general. On the other hand, larger installations frequently use the water-pumping or hydraulic-pumping means heretofore mentioned.

Figure 3:
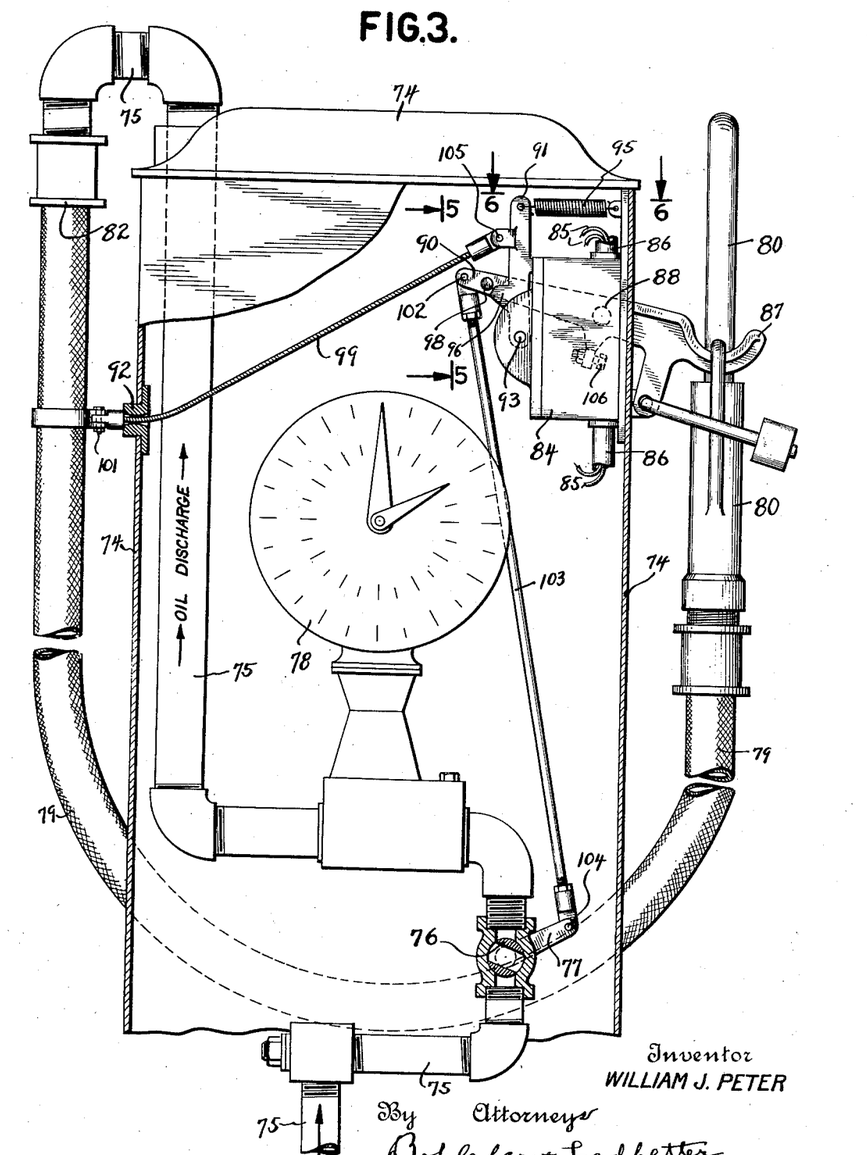
Figure 3 shows a vertical section of a housing with the parts constituting the invention outlined generally in side elevation. This view shows the parts disposed in non-use or in normal position and hence the control valve is closed and the electric circuit and its switch are open.
Figure 4:
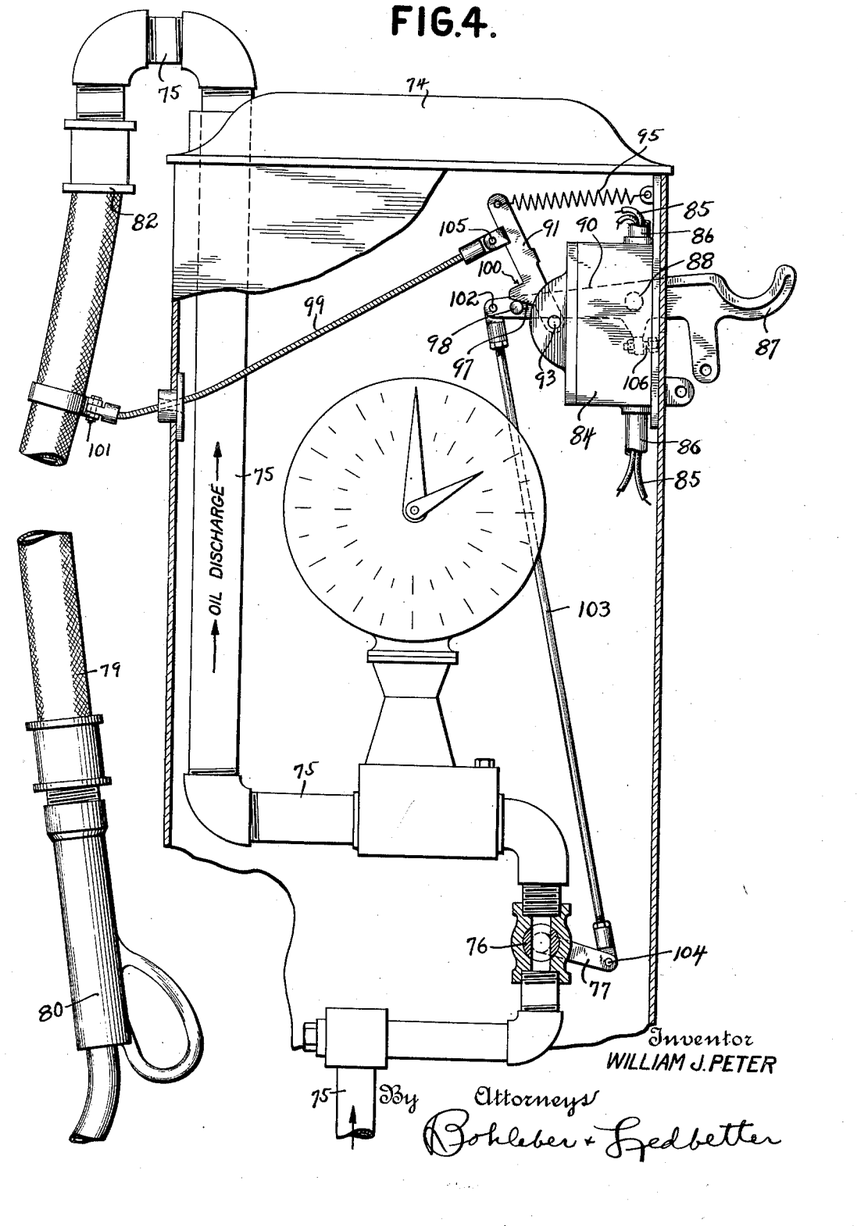
Figure 4 is the same as Figure 3, except that the oil discharge nozzle and hose are removed from the supporting hook, and the nozzle is assumed to be in discharge position, the switch is closed, the valve means is open and oil is discharging from the hose.

The operating and control parts are assembled in a housing 74 and an oil feed or discharge pipe or conduit 75 leads upwardly from a point of storage, not shown, into the housing 74. This oil line 75 includes a control valve the core 76 of which is rotated by a valve arm 77 fixed thereto for opening and closing the valve to start and stop the flow of oil upwardly through the discharge pipe line 75. The pipe 75 continues upwardly and projects through the housing 74, as for example at the upper end thereof. A meter 78 is usually mounted in visible position in the feed line 75. The upper end of the oil pipe 75 is attached to the upper and stationary end 82 of a filling hose 79 on the free end of which is carried a nozzle 80 of approved form convenient to introduce into a fuel tank or other receptacle to be filled.

It is to be noted that the nozzle end 80 of the hose is free for movement to and from filling position and the other end of the hose is relatively stationary where it is attached at 82 to the feed pipe 75 and housing 74 of the apparatus or to a wall panel where a pump stand 74 is not used. Although the attached end 82 of the hose is stationary, nevertheless that flexible portion proximate the housing 74, necessarily possesses a limited movement in relation to the stationary housing 74. The invention, among other things, makes use of movement of both ends of the hose for controlling the action of the dispensing apparatus. To this end, the removal of the nozzle 80 from its support on the housing 74 has to do with the opening of the valve 76 and/or the unlocking of a switch; and the other end toward the coupling 82, or that portion of the hose adjacent the coupling, has to do with the closing of the switch. The hose 79, therefore, must be carried to fully operative or filling position and tensioned before the apparatus will function, and this is an important feature.

Suitable controller means, such as a switch 81—83, is mounted on the inside of a switch box 84 and electric power circuit wires 85 are led through a conduit 86 into the box. The switch 81—83 (Figures 8 and 10) opens and closes the circuit 85 which may be connected to motor means operating a force feed pump to lift or pump oil upwardly through the pipe 75, or the circuit 85 may be connected with a hydraulic control system including solenoid valve means adapted to be opened and closed for controlling the flow of oil upwardly through the pipe 75. In any event, the invention has to do with a circuit and switch means and coordinating a valve therewith. To this end, a hook 87 is pivotally mounted at 88 on the housing 74 and extends through a slot 89 in the housing 74, the hook portion 87 being exposed outside of the housing 74 to receive the nozzle 80 and hold the latter in non-filling position and the inner end 90 on the hook lever extending beyond the switch box 84 on the inside of the housing 74 and is utilized for locking and unlocking a switch control lever arm 91, as will be explained.

The switch arm 91 is pinned to a shaft 93 which is journalled in the switch box 84. A swing arm 94 is mounted in the switch box 84 and has one end thereof anchored to the shaft 93 and upon its other free end there is mounted a switch blade 83 as one element of the switch. Hence by swinging the switch arm 91 outside of the box 84, in a counter clockwise direction, it follows that the switch blade 83 is engaged against the two switch contacts 81 to close the circuit 85 to operate any electric-powered means for controlling a pumping means.

Figures 5, 6, 7:
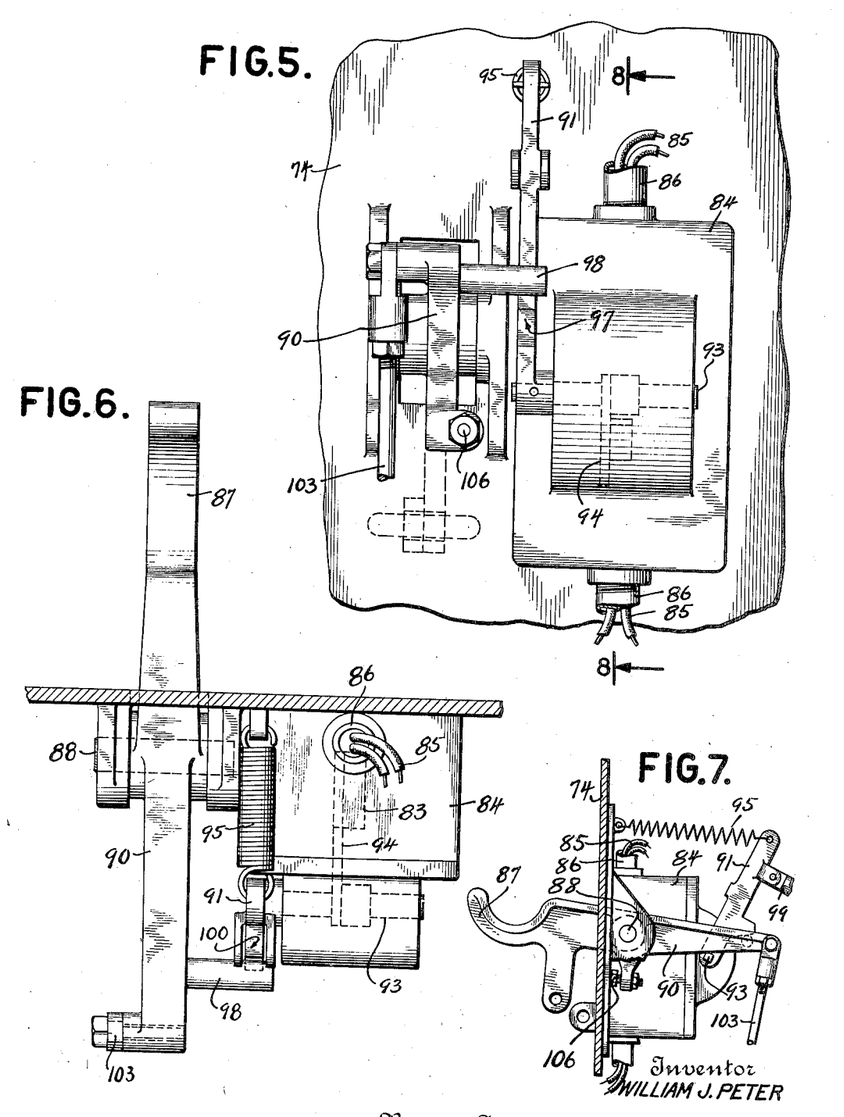
Figure 5 shows a front view of the switch box with the operating parts mounted on the left side thereof, or developed on the line 5—5, of Figure 3, and showing the aperture in the housing through which projects a combination locking-means and lever hook on which the hose nozzle hangs when not in use and effective to prevent a normally open switch from being closed and a normally closed valve from being opened inadvertently.
Figure 6 shows a section taken on the line 6—6 of Figure 3 or 8, looking down on the switch box with the nozzle hook and lock to the left thereof. The switch is shown diagrammatically in dotted lines.
Figure 7 shows a side view of the combined nozzle suporting hook and locking means in front of an electric switch box, the control parts being shown in operating position, the valve means having been first or preliminarily opened by the attendant who pushed up on the hook lever when he removed the nozzle therefrom, and the hose, although not shown here, is assumed to be in service position dispensing gasoline and tensioned or pulled by the operator to close the switch and hold it closed to continue the operation of pumping to force gasoline through the apparatus.

The switch shown is of simple form but in manufacturing practice it is sometimes preferred to use a standard type of plunger switch which includes, for example, a plunger or button 25 or other simple switch means as shown in Figure 1 heretofore explained. The switch arm 91 is held to its normally limited position by a spring 95 as shown in Figures 3, 6 and 8 and in this way the spring acts to maintain the switch 81—83 normally open and hence the circuit 85 is normally open so that any pumping means controlled by the circuit 85 is held against improper operation and consequently oil does not flow upwardly through the feed pipe 75.

The switch arm 91 is provided with a locking nose 96 formed on one edge thereof proximate the inner end 90 of the hook 87. The locking means 96 assumes the form of an inverted nose and presents its lower edge 97 as a stop against a stop pin 98 anchored in the rear end of the hook lever 87—90 for the purpose of stopping the switch at closed position as shown in Figure 10. In other words, the two elements 97 and 98 function as an ordinary stop to properly position the switch at its closed position and to take the strain off of the switch when an attendant is pulling on the hose 79 through a flexible connection 99 running to the switch arm 91 for the purpose of operating the system to dispense oil. The stop means 97—98, therefore, functions to limit the switch against further motion when the circuit is closed and in this way a standard spring loaded high speed snap or toggle switch of any suitable form is not damaged by the leverage and pull of an attendant on the hose 79.

The upper face or edge 100 of the nose 96 defines a locking corner therein as provided by the surface 100 and the vertical edge of the lever 91. This locking corner functions as a lock against closing of the switch 81—83, as portrayed in Figure 9, unless the attendant first has manually pushed the hook 87 upwardly after he removes the nozzle 80 therefrom. The operator preliminarily lowers the stop and lock pin 98 to move the same beyond the range of the locking corner 100 of the nose 96. The switch lever may then be moved to extreme position by which to close the switch. For convenience in description, there is designated a switch locking means comprising the pin 98 and upper edge or corner 100 of the stop nose.

Figures 8, 9, 10:
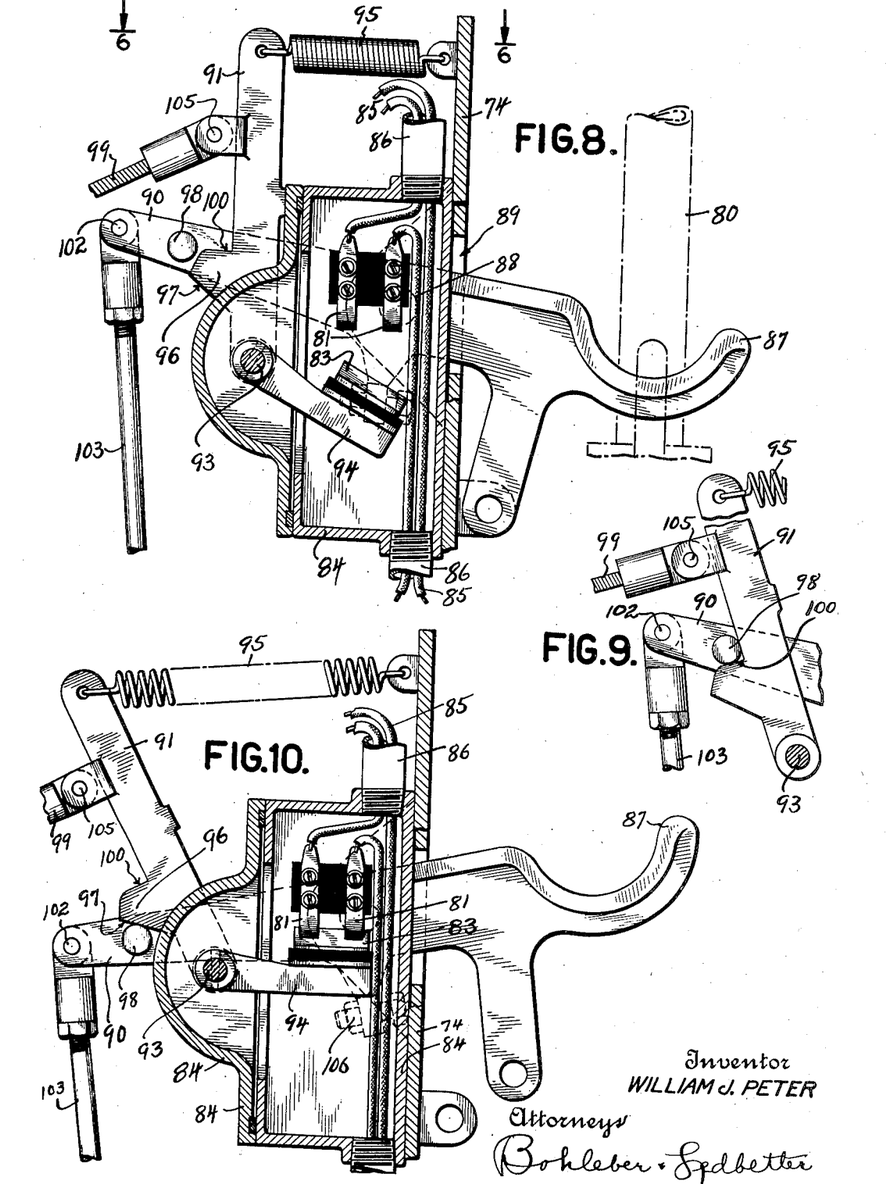
Figure 8 shows a vertical section of a switch box assembly with a diagrammatic switch open and hence the pump-control circuit is open because the nozzle and dispensing hose, in dotted lines, is assumed to be hanging on the hook rendering the switch normally inoperative.
Figure 9 presents an important showing and is a fragmentary view of a switch arm positively locked against switch-closing motion due to the fact that the nozzle has not been removed from its supporting hook or if so the operator has not manually pushed the hook lever to up position to first open the valve means and release the switch lock means; and, therefore, pulling on the hose does not close the switch.
Figure 10 shows the reverse position of Figure 8, with the nozzle removed from the hook lever which has itself been properly first set to open a valve and unlock the switch so that the pump or hydraulic power control circuit is closed and oil is discharging from the hose nozzle.

The switch locking means 98—100 is shown in Figure 9, in the position in which it is set to lock open the switch 81—83 and hence pulling on the cable 99 will not swing the switch arm 91 far enough to close the switch 81—83. Not until the operator has thrust upwardly the hook 87 and lock pin 98 downwardly can he close the switch 81—83 to start the flow of oil through the hose nozzle 80. This arrangement provides against improper or premature operation of the apparatus and renders it safe, and demands of the station attendant that he take certain manual steps before oil can be drawn.

The pin 98 carried by the movable nozzle support 87, or carried particularly by the rear end 90 of the hook lever 87, engages the inclined surface 97 of the projection 96, which projection is carried by the switch or control element operating lever 91. The pin 98 engages the inclined surface 97 at a point substantially to the left of the pivot 93 for the switch operating lever 91 so that a downward pull, such as the weight of the hose and nozzle, exerted upon the movable support 87 supplements the action of the spring 95 to move the lever 91 to the right and open the switch. If the spring should become damaged or fail to open the switch, the movable support 87 provides an emergency means for effecting the opening thereof. The pin 98 and the inclined surface 97 is a second means which is operable as an incident of placing the nozzle on the support 87 and which is operable independently of the first means or the hose pull interconnecting means, which includes the cable 99, for moving the switch or control element 83 into position to stop the flow of liquid. The spring 95 is returning mechanism for normally moving the switch element to open position or position to stop the flow of liquid.

The rear end 90 of the hook lever 87 is pivotally connected at 102 to a valve-operating link 103, the lower end of which is pivoted at 104 to the valve arm 77 fixed to the normally-closed valve 76. This arrangement operatively connects the nozzle hook 87 with the valve 76. In other words, the operator manually displaces the hook 87 upwardly to unlock the switch 81—83 and in doing so he automatically opens valve 76 as shown in Figure 4. The manually operable hook 87 is, therefore, coordinated with the switch control 91 and valve means 76.

The operating cable connection 99 comprises a link means which assumes the form of a flexible cord or strand and it slidably operates through a bushing guide 92 and is connected at the hose on a pivot 101. The other end of the flexible connection 99 is connected at 105 to the switch arm 91 or other form of switch-control means. The hose cable connection 99 slides back and forth through the housing 74 and a small portion of the cable 99 is exposed outside of the housing 74 when the station attendant exerts a pull against the hose 79 to start the flow of oil after introducing the nozzle 80 into a fuel tank of a car or other vehicle to be supplied with oil. This operation closes the control switch and electrifies or powers the pumping means to drive oil through the pipe 75, the attendant having formerly opened valve 76 when he removed the nozzle 80 from the hook 87.

The nozzle hook 87 performs the several functions of holding the nozzle and hose 79 when not in use, locking the switch 81—83 against closing action unless the valve 76 is first opened, and locking the valve 76 against opening motion should the station attendant attempt to close the switch 81—83 prior to properly and orderly throwing the hook 87 up to first open the normally-closed valve 76. This insures safety and avoids improper or premature operation of the apparatus.

The two lever means or members 91 and 90 are operatively mounted at right angles to the other and on parallel axes. The interlocking means 98—100 is shown as comprising the pin 98 and nosed means 96. The structure shown is by way of illustration and it is to be appreciated that it may be altered by repositioning of parts without departing from the principles of the invention. One of the lever means is designed to actuate the switch and lock the normally closed valve against being opened, while the other lever means is designed to open the valve simultaneously with unlocking the switch so the latter may be closed.

An adjustable stop means 106 of any suitable form is carried on the combination hook and valve-operating lever 87—90. Said hook 87 is in upwardly limited position in Figure 7 and consequently the valve-control end 90 is in downwardly limited position to open the valve 76. The stop 106 abuts the housing 74 and causes the lever to stop in proper position to hold the stop pin 98 as a rest for the switch lever 91 and to open the valve to its desired position.

As heretofore mentioned, Figure 9 shows the position of the interlocking means 98—100 when the station attendant has inadvertently pulled on the cable connection 99 without having preliminarily set the apparatus for use by pushing up the hook 87. It is also appreciated that the combination lock and stop pin 98 occupies two operative positions in relation to the switch arm 91. The upper position of pin 98 prevents the switch arm 91 from closing the switch as shown in Figure 9, while the lower position of the locking pin 98 stops the switch 81—83 in closed position and carries the pulling strain imposed on the cable 99 by the operator as shown in Figure 10.

It is important to note that the nose surface 100 positively prevents the lever 87—90 from being cammed or worked down by pulling on the cable 99 which would result in starting the pumping operation with the valve 76 closed, obviously a mode of operation to be avoided.

Figure 11:
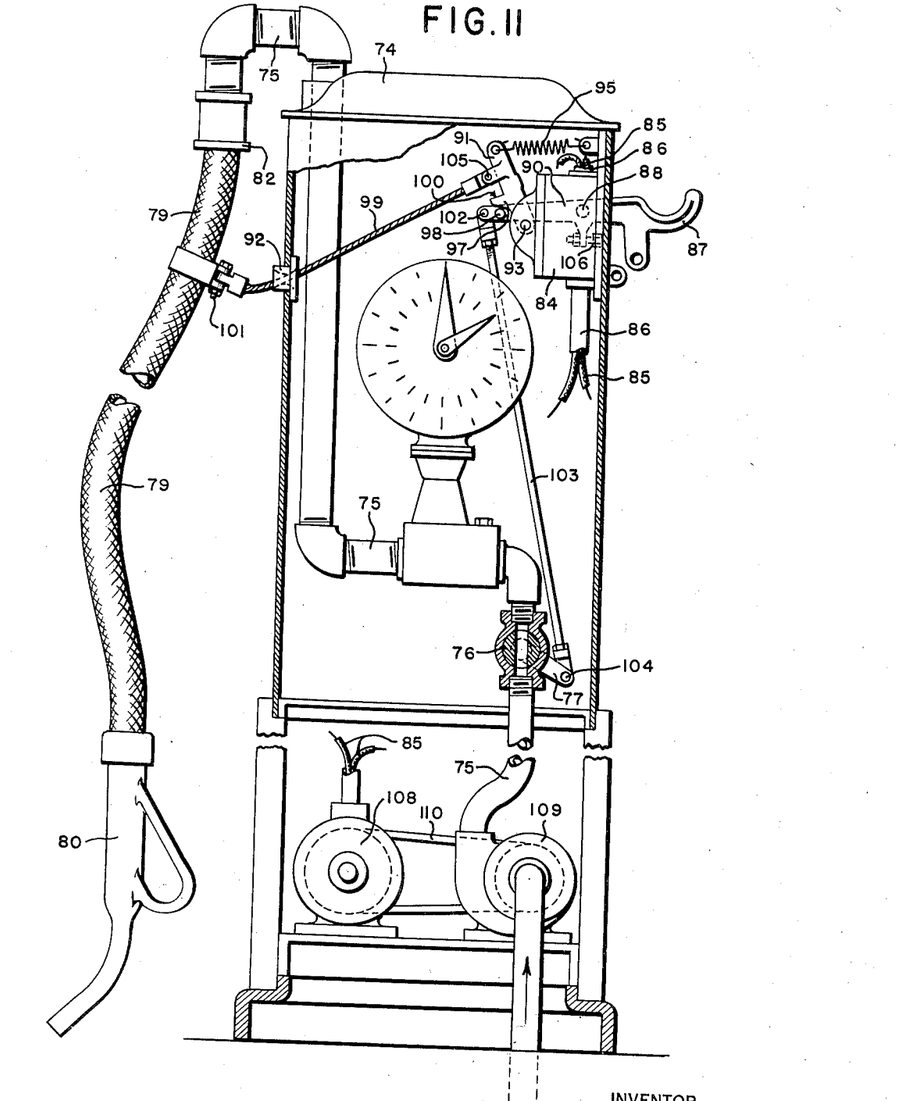
Figure 11 shows a liquid dispenser having a pump driven by an electric motor, the control switch of which is manually actuated by a hose pull control device of the same form as in the third form of the invention (Figures 3–10) and the position of the parts is the same as in Figure 4.

In Figure 11 a liquid dispenser is illustrated having the hose pull control shown in Figures 3 through 10 and hence already described. However, the power circuit wires 85 from the switch 81—83 are connected with an electric motor 108 which drives a pump 109, usually a suction pump, by means of a belt 110. This pump draws the gasoline or other liquid being dispensed from a storage tank usually underground.

The invention provides for safety means and simplicity of structure and fills a long felt want for improvements in a liquid dispenser. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. Liquid dispensing apparatus comprising a discharge line including two sections connected together and relatively movable in relation to each other, a freely movable discharge end carried by one section, a support on which the discharge end is placed when not dispensing liquid, control means to start and stop the flow of liquid through the discharge line, means operated by movement of one section in relation to the other to actuate the control means, and means operated by the support to lock the control means against operation so long as the discharge end is on said support.

2. Liquid dispensing apparatus comprising a discharge line including two tubular sections connected together and relatively movable in relation to each other, control means to start and stop the flow of liquid through the discharge line, an operating connection between the control means and one of the sections whereby movement of one section in relation to the other actuates the control means, a pivoted hook on which one tubular section rests when not in use, a lock to normally prevent operation of the control means, and means operable by the pivoted hook to release the lock.

3. Liquid dispensing apparatus comprising a liquid discharge pipe line adapted to be connected to a source of supply, a flexible discharge hose attached to the line, control means to start and stop the flow of liquid through the line and hose, an operating connection attached to the hose and connected to the control means whereby manual movement of the hose to service and filling position exerts tension on the operating connection to actuate the control means and starts the flow of liquid through the hose, and locking means cooperating with the operating connection to fix the latter against movement.

4. Liquid dispensing apparatus comprising a discharge pipe, a source of liquid supply adapted to be connected to one end of the pipe, flow producing means to force liquid through the pipe, a flexible delivery hose having one end thereof connected to the other end of the pipe, a discharge nozzle on the free end of the hose, control means coordinated with the flow producing means and with the pipe to control the flow of liquid through the hose, a flexible connection having one end thereof attached to that hose portion which is proximate the pipe and the other end thereof being connected to the control means, whereby tension on the hose and release thereof causes the control means to be actuated to start and stop the flow of liquid, a lock to engage and render inoperative the control means, and a hose supporting means on which the nozzle rests to engage and set the lock against the control means to fix the latter against operation.

5. Liquid delivery system comprising a movable discharge line through which liquid is dispensed, storage and liquid forcing means to supply liquid to the discharge line, control means cooperating with the storage and liquid forcing means to stop and start the operation thereof; instrumentalities including an operating connection between one portion of the movable discharge line and the control means, operated by moving the discharge line into dispensing position for actuating the control means, to start the flow of liquid through the discharge line, and to stop the flow of liquid by returning the movable discharge line to its non-dispensing position; and locking means adapted to be engaged by another portion of the movable discharge line, to fix the control means against operation by motion of the operating connection, so long as engaged.

6. Liquid delivery system comprising a flexible hose having a nozzle through which liquid is dispensed, means adapted to supply liquid to the hose, control means cooperating with the liquid supplying means to stop and start the same; instrumentalities including a flexible connection provided between the flexible hose near one end thereof and the control means, operated by pulling the hose into dispensing position for actuating the control means, to start the flow of liquid through the hose and to stop the flow of liquid by returning the hose to its non-dispensing position; a support hook on which the nozzle is placed when the hose is in non-dispensing position, and locking means operated by the nozzle when it is placed upon the support hook to lock the control means against operation.

7. Liquid delivery system comprising a movable discharge line having a stationary end and a free end through which liquid is dispensed, means to supply liquid to the movable discharge line, control means cooperating with the liquid supplying means to stop and start the operation thereof, a pull connection having one end attached to the movable discharge line near its stationary end and the other end of the pull connection being attached to the control means, whereby the pulling of the free end of the movable discharge line to dispensing position places tension on the pull connection and actuates the control means, and locking means on which the free end of the movable discharge line hangs and which releases the control means upon removing said free end.

8. Liquid dispensing apparatus comprising, a housing and a discharge pipe extending upwardly therethrough, a hose connected to the upper end of the pipe and hanging freely outside the housing, control means inside the housing to start and stop the flow of liquid through the pipe, a bushing anchored in the housing, a flexible cable connection slidably disposed in the bushing and having one end attached to the control means, pivot means having its axis parallel to the hose and connecting the other end of the flexible cable to said hose, whereby an attendant may readily swing or pull the hose to service position and simultaneously pull the cable to actuate the control means, a nozzle on the hose, lever means pivotally carried on the housing and including a hook on the outside of the housing and a lock device on the inside thereof, and means cooperating with the lock device to fix the control means against operation by pulling on the hose and operating connection when the nozzle is on the hook.

9. Liquid dispensing apparatus comprising, a housing and a discharge pipe mounted therein, a hose having one end connected to the pipe and a discharge nozzle on its other end outside the housing, the hose having a relatively stationary end and adapted to flex therefrom to its nozzle which is free for movement to service or filling position, liquid forcing and control means in the housing to stop and start the flow of liquid through the pipe and hose, flexible cable means connected between the control means and the hose at a point proximate the stationary end of the hose and extending through the housing, and hook means on the housing on which the nozzle rests when not in use, lock means operated by the hook means and rendered effective to fix the control means against movement when the nozzle is on the hook means and to fix the cable against movement, whereby the nozzle end of the hose is adapted to be removed from the hook means and held in service position by one hand of an operator to release the cable so it can be pulled, and the cable being adapted to be tensioned to operate the control means by pulling on the hose by the other hand of the operator.

10. Liquid dispensing apparatus comprising a housing having an oil discharge pipe extending thereinto, a hose connected to the pipe, an electric power circuit and switch means installed in the housing and adapted to operate pumping means to force liquid through the pipe and hose; means to actuate the switch including a plunger, a roller adapted to engage and depress the plunger, lever means carrying the roller; and a flexible connection having one end attached to the lever means and its other end to the hose and operatively extending through the housing.

11. Liquid dispensing apparatus comprising a housing and discharge pipe therein, a hose attached to the pipe and hanging alongside the housing, a nozzle on the free end of the hose, a hook pivoted on the same side of the housing on which the hose hangs and the nozzle normally on the hook to pull it down, a pump control means in the housing, a lock tilted into operative position by the hook when the latter moves down to fix the control means against operation, and a flexible pull connection extending through the same side of the housing which carries the hose and hook and operatively connecting the hose with the pump control means.

12. Liquid dispensing apparatus comprising a hose and nozzle, conduit means connected thereto for delivering liquid through the hose, means including two spaced valves in the conduit means, force-applying means to urge the valves normally closed, and an operating connection attached to the valves and attached to the hose at a point remote from the nozzle, whereby a pull on the hose opens the valves against the urge of the force-applying means.

13. Liquid dispensing apparatus comprising an oil storage tank, an oil discharge pipe and a hose and nozzle attached thereto and leading from the tank, a hydraulic pumping system including a water inlet pipe connected with the tank, a valve in each pipe, an operating linkage connected between the valves, means urging the valves normally closed when the apparatus is not in operation to stop the flow of water and oil, and a pull connection extending from the hose to the operating linkage, whereby tension on the hose acts to simultaneously open both valves to permit water to flow into the tank to propel oil therefrom.

14. Liquid dispensing apparatus comprising a hose and nozzle, conduit means connected thereto for delivering liquid through the hose, valve means included in the conduit means, force-applying means to urge the valve means normally closed, and an operating connection attached to the valve means and attached to the hose at a point remote from the nozzle, whereby a pull on the hose opens the valve means against the urge of the force-applying means, a housing in which the parts aforesaid are assembled and provided with a slot through which the operating linkage works, a hook carried by the operating linkage and movably extending through the slot formed in the housing, and the nozzle placed on the hook over the slot to lock the valves against motion due to an inadvertent pull on the hose.

15. Liquid dispensing apparatus comprising an oil discharge pipe adapted to be connected with a storage tank, a hose connected to the pipe, a nozzle on the free end of the hose, a water feed pipe to convey a displacement liquid such as water to the storage tank by which to hydraulically pump oil upwardly through the discharge pipe and hose, a valve in the oil discharge pipe, a valve in the water feed pipe, an operating linkage between the valves which simultaneously sets the two valves to the same open or closed position, yieldable means attached to the operating linkage to hold the two valves in normally closed position, a nozzle-support hook coordinated with the valves and operating linkage, means operatively related with hook and the valves by which the valves are locked against opening movement while the nozzle is on the hook, and a flexible connection having one end attached to the hose at a point remote from the nozzle and the other end attached to the operating linkage, whereby the hose may be pulled to open both valves only when the nozzle is off the hook.

16. Liquid dispensing apparatus comprising a discharge pipe and a hose attached thereto with a nozzle on the end of the hose, an electric circuit including a switch means adapted to control a pumping means, a flexible operating connection between the hose and switch means whereby pulling on the hose actuates the switch means, a pivoted hook means, and a stop actuated into operative position when the nozzle is removed from the hook means and against which the switch means comes to rest when moved into closed position to complete the circuit and which stop also sustains the stress which would otherwise be exerted on the switch means by the attendant as he pulls on the hose to maintain the switch means in closed position.

17. Liquid dispensing apparatus comprising a discharge pipe and a hose attached thereto with a nozzle on the end of the hose, an electric circuit including a switch means to control a pumping means, a cable connection between the hose and switch means whereby pulling on the hose actuates the switch means, a pivoted hook means; and a stop means including two stop surfaces, one surface of which locks the switch means against circuit-closing motion so long as the nozzle is on the hook means, and the other surface of which is actuated into operative position when the nozzle is removed from the hook means to act as a protecting stop against which the switch means comes to rest in circuit-closed position.

18. Liquid dispensing apparatus comprising a discharge line and hose having a nozzle, an electric power circuit adapted to operate pumping means, a switch in the circuit, control means operatively connected with the switch to close the same, a manually operable lever including a lock device normally set against movement of the control means to prevent the switch from being closed until said lever is moved by an attendant to unlock the lock device, and an operating connection having one end attached to the hose remote from the nozzle and the other end attached to the control means, whereby a pull on the hose transmits a pulling motion through the operating connection to close the switch.

19. Liquid dispensing apparatus comprising a housing, a discharge line having a hose and nozzle attached thereto, a switch box mounted in the housing, an electric circuit and switch in the box, a lever pivoted on the box and operatively connected to the switch to actuate said switch, a second lever pivoted on the housing and having a lock device which normally engages the first lever to lock it against movement until an attendant manually releases the locking device by shifting said second lever, and an operating connection having one end attached to the hose and its other end to the first lever, whereby a pull on the hose actuates the switch provided the second lever has been set to release the lock device.

20. Liquid dispensing apparatus comprising a housing, a discharge line having a hose and nozzle attached thereto, a valve in the discharge line, a switch box mounted in the housing, an electric circuit and switch in the box, a lever pivoted on the box and operatively connected to the switch to actuate said switch, a second lever pivoted on the housing and having a lock device which normally engages the first lever to lock it against movement until an attendant manually releases the locking device by shifting said second lever, an operating connection having one end attached to the hose and its other end to the first lever, whereby a pull on the hose actuates the switch provided the second lever has been set to release the lock device, and a link connection between the second lever and the valve, whereby the valve is also opened when the second lever is manually shifted aforesaid.

21. Liquid dispensing apparatus comprising a discharge line having a flexible dispensing hose, a housing and a switch box therein, a circuit and switch installed in the box, a hose-operated lever to operate the switch, a flexible connection attached to the flexible hose and to the hose-operated lever whereby the switch is closed by pulling on the hose, a manually-operable lever mounted in proximity to the first lever, means carried by both levers forming a double locking means, one locking means opposing movement of the hose-operated lever to positively prevent the switch from being closed unless the manually-operable lever is first set to release the double locking means, and the other locking means opposing movement of the manually-operable lever unless the hose-operated lever is free and hence not under tension of the flexible connection.

22. Liquid dispensing apparatus comprising a discharge line having a flexible dispensing hose, a housing and a switch box therein, a circuit and switch installed in the box, a hose-operated lever to operate the switch, a flexible operating connection attached to the flexible hose and to the hose-operated lever whereby the switch is closed by pulling on the hose, a manually-operable lever mounted in proximity to the first lever, a combination stop and lock pin on the manually-operable lever, a combination stop and lock projection on the hose-operated lever, and the pin and the projection interlocking to positively prevent movement of either lever unless the manually-operable lever is first set to remove the pin from its interlocking position before the hose is pulled to actuate the hose-operated lever.

23. Liquid dispensing apparatus comprising an oil discharge line, a hose connected thereto, an electric circuit including a switch, a first lever connected to the switch to close it, a link connecting the first lever with the hose whereby pulling on the hose closes the switch, a second lever cooperating with the first lever, a combination stop and lock pin on one lever; and a combination stop and lock projection on the other lever, whereby inadvertently attempted movement of the first lever, without first having moved the second lever, results in interlocking the pin and lock projection so that neither lever can be moved.

24. Liquid dispensing apparatus comprising an oil discharge line, a valve in the line, a hose connected thereto, an electric circuit and switch to control a pumping means, a vertically disposed lever operatively connected with the switch and adapted to close the switch by counter-clockwise motion, a flexible link connection between the hose and the lever whereby the switch may be closed by pulling on the hose, a horizontally disposed lever pivoted to one side of and reaching beyond the vertical lever, a pin on the end of the horizontally disposed lever and always in line of motion of the vertical lever; and a projection on the vertical lever including an upper horizontal surface defining a lock notch into which the pin fits and interlocks to positively prevent the closing of the switch, and a lower angular stop surface against which the stop pin abuts to stop the vertical lever in closed-switch position to receive the pull of an attendant when he is pulling on the hose to hold the switch closed, whereby an attendant must first actuate the horizontal lever before he can close the switch.

25. Liquid dispensing apparatus as defined in claim 24 and including a link connection between the valve in the discharge line and the horizontally disposed lever, whereby the valve is simultaneously opened when said horizontal lever is actuated preliminary to closing the switch.

26. A liquid dispensing apparatus comprising a discharge line having a nozzle, a switch box in which a switch and circuit wires are installed, a horizontal lever pivoted adjacent the box with a hook on one end thereof to support the nozzle and a combination lock and stop pin on the other end thereof, a vertical lever pivoted on the box and connected to the switch, means to operate the vertical lever from the hose, a nose on the vertical lever and including two stop surfaces, one stop surface movable into locking engagement with the stop pin by short movement of the vertical lever in event the vertical lever is actuated from the hose before the nozzle is removed from the hook and acting to positively stop the travel of the vertical lever before the switch is closed, and the other stop surface movable into engagement with the stop pin by long movement of the vertical lever in event the horizontal lever is first actuated to displace the lock and stop pin out of the path of travel of the first stop surface whereby the switch is closed.

27. Liquid-flow and circuit-control means comprising a switch box, two members pivoted relatively thereto, a valve connected to one pivoted member and opened thereby, a switch connected to the other pivoted member and closed thereby; and means cooperating with both members to compel an attendant to first open the valve by actuating that member which is connected to the valve, and thereafter close the switch by actuating the other member.

28. Liquid-flow and circuit-control means comprising a switch box, two members pivoted relatively thereto, a valve connected to one member and opened thereby, a switch connected to the other member and closed thereby, an inverted nose having a short and long surface on one member, a stop pin on the other member; whereby an attendant is compelled to first manually set the member connected to the valve by which the valve is first opened, and thereafter close the switch by moving said member connected to the switch until said member stops against the long surface, else the pin will stop that member which is connected to the switch before the switch is closed.

29. Liquid-flow and circuit control means comprising a box in which a circuit and switch are assembled, arm means mounted on the box to actuate the switch, a valve and lever means to actuate said valve, a stop pin on the lever means and serving two purposes; and a projection on the arm means which swings under the stop pin to positively fix the lever means against valve-opening motion in event the valve is not opened prior to movement of the arm means, and which swings over the stop pin and comes down thereon and at rest thereagainst in event the valve is properly opened prior to the attempted movement of the arm means whereby the switch is protected from undue closing strain.

30. Liquid-flow and circuit-control means comprising, an electric switch and valve, two pivoted levers normally standing substantially at right angles to each other, a separate operating connection from each lever to the switch and valve, and a combination lock and stop means which positively prevents one lever from closing the switch unless the other lever is first set to open the valve.

31. Liquid-flow and circuit-control means comprising, an electric switch and valve, two pivoted levers normally standing substantially at right angles to each other, a separate operating connection from each lever to the switch and valve, a pin on one lever in the path of movement of the other lever and said pin being held normally away from the pivot of the other lever whereby said pin acts as a stop to limit the other lever to short angular motion to prevent actuation of the switch, and said pin being moved toward the pivot of the other lever to preliminarily actuate the valve and admit a long angular movement of the other lever to admit actuation of the switch.

32. Liquid-flow and circuit-control means comprising a box in which a circuit and a normally open switch are assembled, an arm and operating means therefrom mounted on the box to close the switch, a normally closed valve, a lever mounted on the housing with operating means therefrom to open the valve, a projection on the arm defining a locking corner, a pin on the lever and normally in alignment with the locking corner whereby the arm swings its locking corner into the path of movement and in front of the pin to positively lock the normally-open switch against closing action and to lock the normally closed valve against opening action, and thereby compelling the attendant to first swing the lever and hence the pin out of alignment with the locking corner to open the valve and to free the arm for switch-closing action.

33. Liquid dispensing apparatus comprising a discharge pipe extending upwardly, a hose connected to the upper end of the pipe and hanging freely, control means adapted to start and stop the flow of liquid through the pipe, a pivoted lever actuating the control means, a guide means in the plane of the pivoted lever and substantially in alignment with its direction of movement, a universally flexible connection slidably disposed in the guide means and having one end attached to the pivoted lever and the other end attached to the hose at a point spaced from the connection of the hose and pipe whereby an attendant may readily swing or pull the hose in any direction to service position and simultaneously pull the flexible connection to actuate the control means.

34. Liquid dispensing apparatus comprising a discharge line including two sections connected together and swingable relatively one on the other to a dispensation position, control means to start and stop the flow of liquid through the discharge line, actuating means operated by movement of one section in relation to the other to actuate the control means, and means co-operating with the actuating means to afford substantial universal movement of said one section in any direction to said dispensing position.

35. A liquid dispensing apparatus comprising a pump stand, a delivery conduit freely suspended exteriorly to the stand, means within the stand for delivering liquid to said conduit, said means including an electric pump and a switch for starting and stopping the pump, a tension member secured to the said conduit below its point of suspension and extending into the stand, means operatively connecting the inner end of said member to said switch so that by pulling the said conduit outwardly from the stand the switch will be moved to starting position, and means for restoring the switch to stopping position when the pull on the conduit is released.

36. A liquid dispensing apparatus comprising a pump stand, a delivery line including a fixed conduit within the stand and projecting at one end therefrom and a hose without the stand and suspended from said projecting end, said means including an electric pump and a switch for starting and stopping the pump, a tension member secured to the hose near its point of suspension and extending into the stand, means operatively connecting the inner end of said member to said switch so that by pulling the hose outwardly from the stand the switch will be moved to starting position, and means for restoring the switch to stopping position when the pull on the hose is released.

37. A liquid dispensing apparatus comprising a delivery line including a fixed portion and a suspended portion movable angularly with respect to the fixed portion, pumping means for supplying liquid to the line, a switch for starting and stopping the pumping means, flexible connecting means attached at one end to said suspended portion below its point of suspension and at the other end to the switch whereby the switch may be pulled to starting position by pulling said portion out of normal depending position, and means urging the switch to stopping position to stop the pumping means when the pull on said portion is released.

38. A liquid dispensing apparatus comprising a delivery line having a fixed portion and a depending flexible portion suspended therefrom, pumping means for supplying liquid to the line, a controller for said pumping means, and connecting means from the controller to said depending portion below its point of suspension whereby the pumping means may be controlled by swinging said flexible portion from and toward its normal depending position.

39. In a dispensing apparatus comprising a discharge pipe, a delivery conduit connected with said discharge pipe and having a downwardly extending inner end portion suspended for swinging movement transverse to its length, power operated means for discharging liquid through said pipe and said conduit, mechanism to control the discharge of liquid by said means including an actuating device movable to one position to initiate said discharge and to another position to interrupt said discharge, a flexible member connecting said device with said downwardly extending portion of said conduit, a guide for said flexible member so arranged that the transverse movement of said portion of said conduit, either outwardly or laterally with relation to said discharge pipe, will cause said device to initiate the discharge of liquid, and retractile means acting on said device and said flexible member to return said conduit to its normal position and to cause said device to interrupt the discharge of liquid.

40. In a liquid dispensing apparatus comprising a delivery conduit having a downwardly extending portion supported for swinging movement transverse to its length, a pump to discharge liquid through said conduit, and a motor to operate said pump, mechanism to control the operation of said pump by said motor and including an actuating device, means for holding said device normally in a position to prevent the operation of said pump by said motor, a flexible member connecting said device with said downwardly extending portion of said conduit, and a guide for said flexible member so arranged that the transverse movement of said portion of said conduit, either outwardly or laterally, will cause said device to initiate the operation of said pump by said motor.

41. A liquid dispenser for motor fuel and the like having a meter adapted to measure the liquid being delivered comprising, a delivery line including a pipe and a flexible discharge hose normally suspended therefrom and having movement in relation to said pipe, means for applying pressure to the liquid to force the same upwardly to the delivery line to supply liquid thereto, control means for said liquid supplying means to start and stop the flow of liquid, and an operating connection between the control means and the suspended hose and spaced below its point of suspension, whereby the liquid supplying means may be manually controlled while an operator holds the flexible hose by pulling or swinging said hose from its normally suspended position to dispense the desired quantity of liquid.

42. A liquid dispenser for motor fuel and the like having a meter adapted to measure the liquid being delivered comprising, a delivery line including a pipe and a flexible discharge hose normally suspended therefrom and having movement in relation to the pipe, an electrically controlled means for starting and stopping the flow of liquid to the delivery line including a normally open switch, an operating connection having one end attached to the discharge hose below its point of suspension and the other end thereof attached to the switch, whereby said switch may be closed to the starting position by a manual pull on the hose to dispense the desired quantity of liquid, and means urging the switch back to open position to stop the flow of liquid when the pull on said hose is released upon the meter indicating the desired quantity of dispensed liquid.

43. A liquid dispenser for motor fuel and the like comprising, an upright dispenser stand, a delivery line including a fixed pipe within and projecting from the stand, a liquid discharge hose outside the stand and connected with and suspended from the projecting end of the pipe, flow producing means including an electrical switch for starting and stopping the flow of liquid to the delivery line, an operating connection having one end secured to the hose near its point of suspension and extending into the stand with its other end connected to the switch, whereby a pull on the hose in relation to the stand actuates said switch to its starting position, and means for stopping the flow producing means when the desired quantity of liquid is dispensed.

44. A liquid dispenser for motor fuel and the like, comprising an upright dispenser stand, a delivery hose suspended for free movement exteriorly of the stand and having a discharge nozzle on its outer end, a support on the stand for the nozzle when not in use, flow producing means for delivering liquid to the hose and nozzle, a control device within the stand for controlling the operation of the flow producing means, a tension member secured to the hose below its point of suspension and proximate the support for the nozzle and extending into the stand, means operatively connecting the inner end of the tension member to the control device, whereby a pull on the hose in relation to the stand moves the control device to its starting position, and means for restoring the control device to its stopping position when the pull on said hose is released.

45. In a dispensing system, a conduit for fluid, means for controlling the flow of fluid through the conduit, a nozzle assembly for the conduit, and means adapted to be engaged by the nozzle assembly when not in use, said fluid controlling means being controlled by movement of the conduit and by the nozzle engaged means.

46. In a dispensing system, a movable conduit for fluid, a member operated by movement of the conduit, means for controlling the flow of fluid through the conduit, a nozzle assembly for the conduit, and means adapted to be positioned as an incident to movement of the nozzle assembly to the position it occupies when not in use, said fluid controlling means being controlled jointly by the conduit operated member and the means positioned as an incident to movement of the nozzle assembly.

47. In a dispensing system, a discharge pipe, a flexible hose attached at one end thereto, a nozzle assembly on the other end of the hose, a support on which the nozzle may be hung when not in use, an element movable to control the flow through said pipe and hose, means interconnecting said element and hose for moving the element by pulling on the hose, and means operable as an incident to the placing of the nozzle assembly on the support for rendering said element inoperative to start the flow.

48. In a liquid dispensing apparatus adapted to be connected with a source of liquid supply, the combination of a discharge hose, means for supplying liquid from said source to said discharge hose, control means for operating said first named means, said control means including a support for said hose, a connection between said hose and a portion of said control means whereby movement of said hose operates said control means, and means associated with said support for rendering said control means inoperative when said hose is supported on said support.

49. A liquid dispenser for motor fuel and the like having a meter, comprising in combination, a liquid delivery line including a flexible discharge hose with a nozzle on its outer end to dispense a measured quantity of liquid, flow-producing means in communication with the delivery line to supply liquid through the hose and nozzle, control means operable to start and stop the operation of the flow-producing means; an operating connection between the flexible hose and the control means to actuate and hold said control means to its starting position by an operator manually pulling on said hose, including means so arranged that a pull from any convenient position and direction, in relation to the dispenser, will actuate said control means; supporting means for holding the hose and nozzle when not in dispensing use, and means for returning the control means to its stopping position when the desired amount of liquid is dispensed.

50. In a gasoline dispensing apparatus, the combination of a motor; a switch for the motor; a service hose; means actuated in response to an action of the hose in service closing the switch; a movable support for the end of the hose; and means acting with a movement of the support opening the switch.

51. In a gasoline dispensing apparatus, the combination of a motor; a switch for the motor; a service hose; means operable from the service end of the hose closing the switch; a movable support for the service end of the hose; and means acting with a movement of the support opening the switch.

52. In liquid dispensing apparatus; the combination with a stationary pump stand; of a liquid dispensing pump; an electric motor operatively connected with said pump; a liquid discharge conduit in communication with said pump and including a flexible hose; an electric switch in the pump stand for controlling the energizing circuit of said motor; means cooperatively connecting said flexible hose with said switch, including a flexible connector extending through said wall of said pump stand and having one end connected with said hose; whereby said switch may be closed to operate said pump, by the operator flexing said hose to position for a dispensing operation; a spring for automatically opening said switch and stopping said pump when said hose is released; a movable hose support on said stand; and means connecting said hose support with said switch, for holding the latter open by said support, whereby said switch is held open when said hose is held by said support.

53. In liquid dispensing apparatus; the combination with a stationary pump stand; of a liquid dispensing pump; an electric motor operatively connected with said pump; a liquid discharge conduit in communication with said pump and including a flexible hose; an electric switch in the pump stand adapted to control the energizing circuit of said motor; means cooperatively connecting said flexible hose with said switch; whereby said switch may be closed by movement of said hose; and a hose support fulcrumed in said stand and connected with said switch; whereby, when said hose is held on said support, said switch is prevented from being closed by movement of said hose.

54. In a dispensing system, a discharge pipe, a flexible hose attached at one end thereto, a nozzle on the other end of the hose, a support on which the nozzle may be hung when not in use, an element movable to control the flow through said pipe and hose, a first means interconnecting said control element and hose for moving the element by pulling on the hose, and a second means operable as an incident of placing the nozzle on the support and operable independently of the first means for moving said control element into position to stop said flow.

55. In a dispensing system, a discharge pipe, a flexible hose attached at one end thereto, a nozzle on the other end of the hose, a support on which the nozzle may be hung when not in use, an element movable to control the flow through said pipe and hose, a first means interconnecting said element and hose for moving the element by pulling on the hose, returning mechanism for normally moving said control element to initial position to stop said flow, and a second means operable as an incident of placing the nozzle upon the support and operable independently of the first means for moving said control element into position to stop said flow in case the returning mechanism fails to function.

56. In a dispensing system, a discharge pipe, flexible hose attached at one end thereof, a nozzle on the other end of the hose, a support on which the nozzle may be hung when not in use, an element movable to control the flow through said pipe and hose, means interconnecting said control element and hose for moving said element by pulling on the hose, means operable as an incident to the placing of said nozzle on the support for rendering said control element inoperative to start the flow, and means compelling such operation of the aforesaid means as a prerequisite to the padlocking of said nozzle on its support.

57. In a dispensing system, a discharge pipe, a flexible hose attached at one end thereof, a nozzle on the other end of the hose, a support on which the nozzle may be hung when not in use, an element movable to control the flow through said pipe and hose, means interconnecting said control element and hose for moving said element by pulling on the hose, a second means operable independently of the first named means for moving said control element into position to stop the flow, the second named means having means to receive a padlock, and means compelling such operation of the second named means as a prerequisite to the padlocking of said nozzle on its support.

58. In liquid dispensing apparatus; the combination with a stationary pump stand; of a liquid dispensing pump; an electric motor operatively connected with said pump; a liquid discharge conduit in communication with said pump and including a flexible hose; an electric switch in the pump stand for controlling the energizing circuit of said motor; means cooperatively connecting said flexible hose with said switch, including a flexible connector extending through said wall of said pump stand and having one end connected with said hose; whereby said switch may be closed to operate said pump, by the operator flexing said hose to position for a dispensing operation; a spring for automatically opening said switch and stopping said pump when said hose is released; a movable hose support on said stand; means connecting said hose support with said switch for holding the latter open by said support; whereby said switch is held open when said hose is held by said support; and means for locking said hose on said support; whereby said switch is held open and rendered inoperative when said hose is thus held in idle position, and accidental and malicious operation of said switch by said flexible connector then and thus prevented.

59. In a liquid dispensing apparatus adapted to be connected with a source of liquid supply, the combination of a pump adapted to be connected with a source of supply, a motor for operating said pump, a switch for controlling the operation of said motor, a meter connected with said pump, indicating means operated by said meter for showing the amounts of liquid dispensed, a flexible hose connected to the outlet side of said meter, a nozzle for said hose, a member adapted to be engaged by said nozzle having means associated with said switch whereby said switch is locked when said member is engaged by said nozzle, and means disposed between said hose and switch for operating said switch upon movement of said hose.

60. Liquid dispensing apparatus comprising a liquid discharge pipe line connected to a source of supply, a flexible hose attached at one end to the pipe line, and a nozzle on the other end, control means to start and stop the flow of liquid through the pipe line and hose, an operating connection attached to the hose at a point near the pipe line and connected to the control means, whereby an attendant may conveniently hold the nozzle in one hand and carry it to service and filling position and with the other hand exert tension on the operating connection to actuate the control means and start the flow of liquid through the hose.

61. A liquid dispenser for motor fuels and the like comprising, in combination, a stationary upright discharge pipe adapted to be connected with a source of liquid supply and pumping means, and having a meter connected in with said pipe to indicate the amount of liquid flowing therethru, a controller in normally "off" position to stop and start the operation of the pumping means, a flexible dispensing hose connected with the upper end of the pipe and hanging downwardly alongside the dispenser and beyond the controller with a dispensing nozzle on its free end, a flexible operating means interconnected between the controller and the hose, said flexible operating means having a point of attachment with the hose just below the upper end of the stationary upright pipe thus providing a short section of flexible hose between said pipe and said point of attachment which affords a range of motion for the flexible operating means to actuate the controller, and the hose portion below the point of attachment being substantially longer than the section thereabove, whereby an operator may readily handle the longer hose portion for dispensing the liquid through the nozzle by pulling on said hose substantially in any direction away from the dispenser on the meter side thereof while simultaneously watching said meter and holding the controller in its "on" position, and retracting means effective on the controller to instantly return same to its normally "off" position when the operator observes the correct indication on the meter of the liquid dispensed and simultaneously releases his pull on the hose.

WILLIAM J. PETER.